United States Patent
Park et al.

(10) Patent No.: US 10,623,220 B2
(45) Date of Patent: Apr. 14, 2020

(54) METHOD FOR TRANSMITTING SIGNAL IN WIRELESS LAN SYSTEM, AND DEVICE THEREFOR

(71) Applicant: LG ELECTRONICS INC., Seoul (KR)

(72) Inventors: Sungjin Park, Seoul (KR); Kyungtae Jo, Seoul (KR); Jinmin Kim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/083,320

(22) PCT Filed: Mar. 9, 2017

(86) PCT No.: PCT/KR2017/002569
§ 371 (c)(1),
(2) Date: Sep. 7, 2018

(87) PCT Pub. No.: WO2017/155330
PCT Pub. Date: Sep. 14, 2017

(65) Prior Publication Data
US 2019/0097854 A1 Mar. 28, 2019

Related U.S. Application Data

(60) Provisional application No. 62/306,082, filed on Mar. 10, 2016, provisional application No. 62/306,084, (Continued)

(51) Int. Cl.
*H04L 27/26* (2006.01)
*H04L 5/00* (2006.01)
(Continued)

(52) U.S. Cl.
CPC ........ *H04L 27/2602* (2013.01); *H04L 5/0005* (2013.01); *H04L 5/0037* (2013.01);
(Continued)

(58) Field of Classification Search
CPC ..... H04L 5/00; H04L 5/0044; H04L 27/2627; H04L 27/2628; H04L 27/2602; H04W 72/0453
See application file for complete search history.

(56) References Cited

U.S. PATENT DOCUMENTS

2014/0044064 A1 2/2014 Nangia et al.
2015/0063288 A1 3/2015 Yang et al.
(Continued)

OTHER PUBLICATIONS

PCT International Application No. PCT/KR2017/002569, Written Opinion of the International Searching Authority dated May 23, 2017, 18 pages.

*Primary Examiner* — Gbemileke J Onamuti
(74) *Attorney, Agent, or Firm* — Lee Hong Degerman Kang Waimey

(57) ABSTRACT

The present specification relates to a method for transmitting a signal by a station in a wireless LAN (WLAN) system. More specifically, the present specification proposes a frequency division multiple access (FDMA) frame structure for transmitting, by a station, a signal to a plurality of stations by using an FDMA method, and presents a method for transmitting a signal on the basis of the FDMA frame structure and a device therefor.

8 Claims, 19 Drawing Sheets

| CH 1 | L - STF | L - CE | L - Header | ay Header A | ay STF | ay CE | ay Header B | ay payload |
|---|---|---|---|---|---|---|---|---|
| | GF-STF | GF-CE | | | | | | |
| CH 2 | L - STF | L - CE | L - Header | ay Header A | | | | |

(L: legacy, GF: gap filling, ay: 802.11ay)

Related U.S. Application Data filed on Mar. 10, 2016, provisional application No. 62/306,087, filed on Mar. 10, 2016.

(51) Int. Cl.
  *H04W 72/04* (2009.01)
  *H04B 7/0413* (2017.01)
  *H04W 84/12* (2009.01)

(52) U.S. Cl.
  CPC .......... *H04L 5/0044* (2013.01); *H04L 5/0048* (2013.01); *H04L 5/0064* (2013.01); *H04L 27/2627* (2013.01); *H04L 27/2628* (2013.01); *H04W 72/0453* (2013.01); *H04B 7/0413* (2013.01); *H04L 5/0007* (2013.01); *H04L 5/0023* (2013.01); *H04W 84/12* (2013.01)

(56) References Cited

U.S. PATENT DOCUMENTS

| | | |
|---|---|---|
| 2015/0223247 A1 | 8/2015 | Yang et al. |
| 2015/0381330 A1 | 12/2015 | Chen et al. |
| 2016/0044675 A1 | 2/2016 | Chen et al. |
| 2016/0183189 A1* | 6/2016 | Merlin .............. H04W 52/0219 370/311 |

\* cited by examiner

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: legacy, GF: gap filling, ay: 802.11ay)

METHOD FOR TRANSMITTING SIGNAL IN WIRELESS LAN SYSTEM, AND DEVICE THEREFOR

CROSS-REFERENCE TO RELATED APPLICATIONS

This application is the National Stage filing under 35 U.S.C. 371 of International Application No. PCT/KR2017/002569, filed on Mar. 9, 2017, which claims the benefit of U.S. Provisional Application No. 62/306,082, filed on Mar. 10, 2016, 62/306,084, filed on Mar. 10, 2016 and 62/306,087, filed on Mar. 10, 2016, the contents of which are all hereby incorporated by reference herein in their entirety.

TECHNICAL FIELD

The present invention relates to a method for transmitting a signal by a station in a wireless LAN (WLAN) system, and more specifically, to a frequency division multiple access (FDMA) frame structure for transmitting, by a station (e.g., PCP/AP), a signal to a plurality of stations (e.g., 11ay UE) by using an FDMA method, a method for transmitting a signal on the basis of the FDMA frame structure and a device therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE

Technical Problem

A frame structure for supporting MIMO technology for a plurality of stations is required to be defined.

In this respect, an object of the present invention is to provide a frame structure for supporting MIMO technology for a plurality of stations and a method for transmitting to a plurality of stations on the basis of an FDMA method.

Particularly, the present invention defines an FDMA frame structure for efficiently transmitting a signal depending on that a transmission fast fourier transform (FFT) size of a station (e.g., PCP/AP) for transmitting a signal is equal to or different from a reception FFT size of a station (e.g., 11ay UE) for receiving the signal, and a method for transmitting the signal on the basis of the FDMA frame structure.

Technical Solution

In one aspect of the present invention to solve the aforementioned problems, a method for transmitting a signal by an access point (AP) to a first station (STA) and a second STA in accordance with a frequency division multiple access (FDMA) method in a wireless LAN (WLAN) system comprises determining an FDMA frame structure based on one or more first channels allocated to the first STA and one or more second channels allocated to the second STA; and transmitting a signal to the first STA and the second STA based on the determined FDMA frame structure, wherein the determined FDMA frame structure includes a first direction current (DC) tone located at a center of a first frequency band corresponding to the one or more first channels allocated to the first STA and a second DC tone located at a center of a second frequency band corresponding to the one or more second channels allocated to the second STA.

Meanwhile, in another aspect of the present invention, an access point (AP) device for transmitting a signal in a wireless LAN (WLAN) system comprises a transceiver having one or more radio frequency (RF) chains, configured to transmit and receive a signal to and from a first station (STA) and a second STA in accordance with a frequency division multiple access (FDMA) method; and a processor connected with the transceiver, processing signal transmission and reception with the first STA and the second STA, wherein the processor is configured to determine an FDMA frame structure based on one or more first channels allocated to the first STA and one or more second channels allocated to the second STA and transmit a signal to the first STA and the second STA based on the determined FDMA frame structure, and wherein the determined FDMA frame structure includes a first direction current (DC) tone located at a center of a first frequency band corresponding to the one or more first channels allocated to the first STA and a second DC tone located at a center of a second frequency band corresponding to the one or more second channels allocated to the second STA.

In this case, the FDMA frame structure may be applied to a case that a transmission fast fourier transform (FFT) size of the AP is different from a reception FFT size of the first STA and the second STA.

At this time, the FDMA frame structure may further include one or more guard tones in a region between the first frequency band and the second frequency band.

Also, each of the first DC tone and the second DC tone may include one or more tones.

At this time, the number of tones included in the first DC tone may be the same as or different from the number of tones included in the second DC tone.

If there are a plurality of the first channels, the FDMA frame structure may include additional DC tone located at a center of each of the first channels.

At this time, a position of the additional DC tone may correspond to a position corresponding to the center frequency of each of the first channels.

Advantageous Effects

Through the aforementioned configuration, the station (e.g., PCP/AP) according to the present invention may transmit a signal to a plurality of other stations (e.g., 11ay UE) without an error in accordance with an FDMA method.

Particularly, according to the present invention, a signal may easily be transmitted depending on that a transmission FFT size of a station (e.g., PCP/AP) is equal to or different from a reception FFT size of a station (e.g., 11ay UE) for receiving the signal.

The effects that may be obtained by the present invention are not limited to the above-mentioned effects, and other effects not mentioned above will be clearly understood by those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System

1-1. Generals of WLAN System

Figure 1:
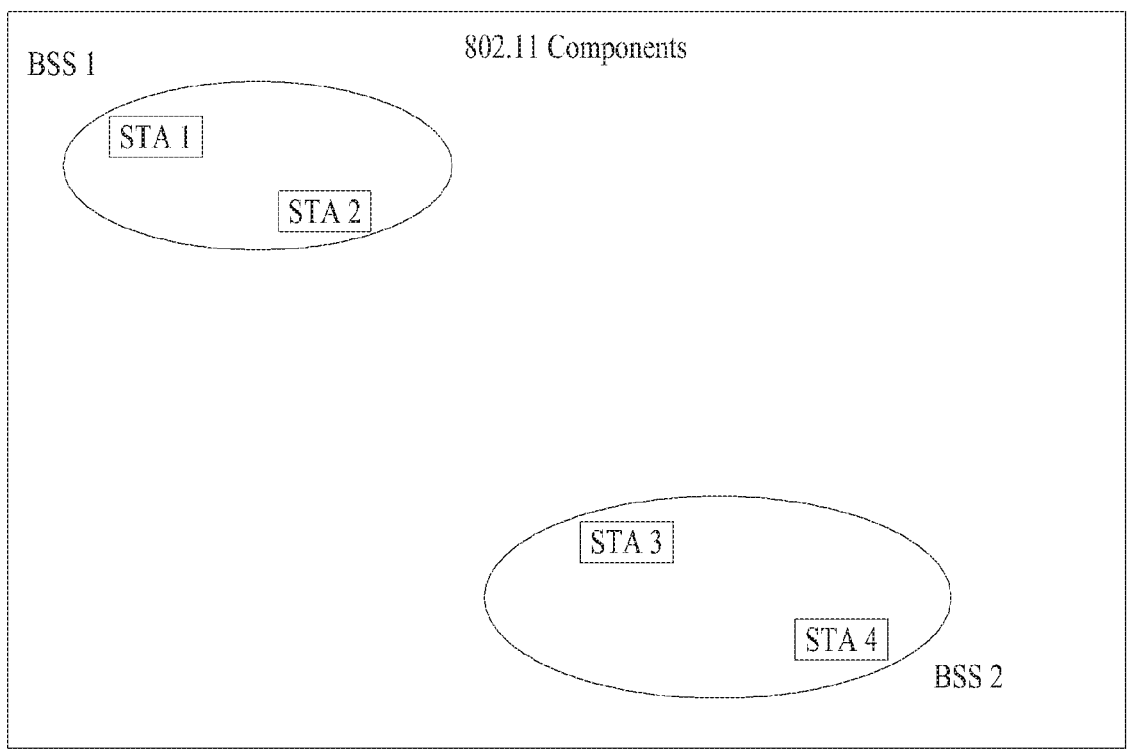
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
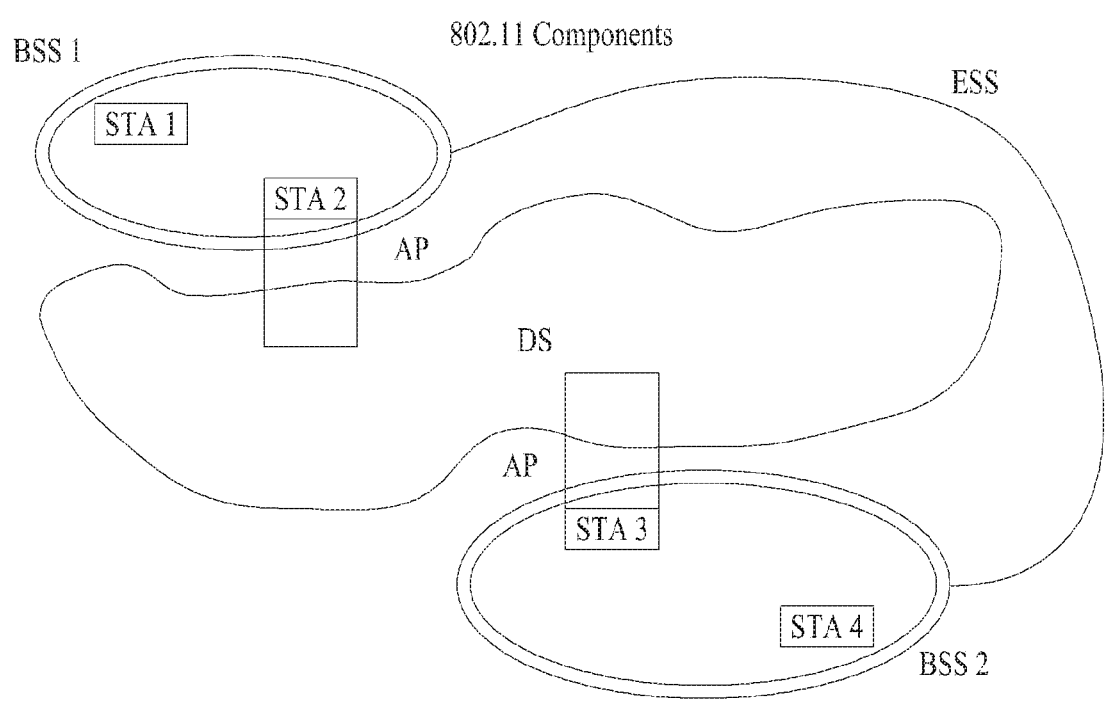
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
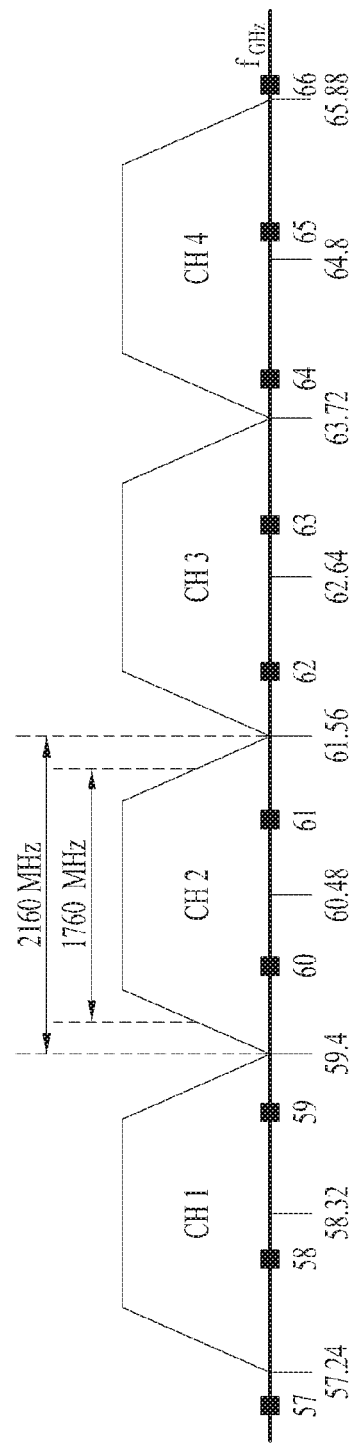
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the channels used for channel bonding by the present invention is not limited to a specific channel.

Figure 4:
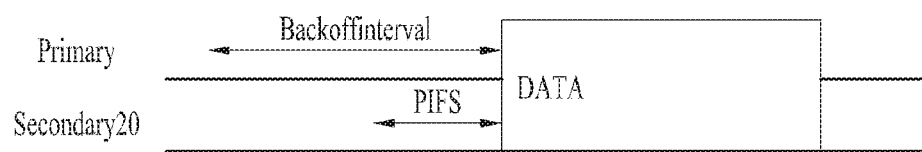
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
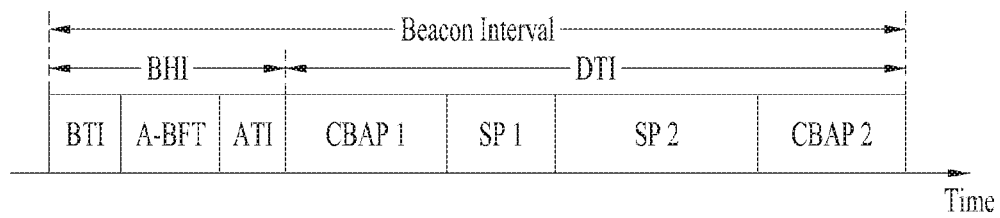
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY (SC PHY) | 1 ... 12<br>25 ... 31 | (low power SC PHY) |
| OFDM PHY | 13 ... 24 | |

Such modulation modes may be used to satisfy different requirements (e.g., high throughput or stability). Depending on the system, only some of these modes may be supported.

Figure 6:
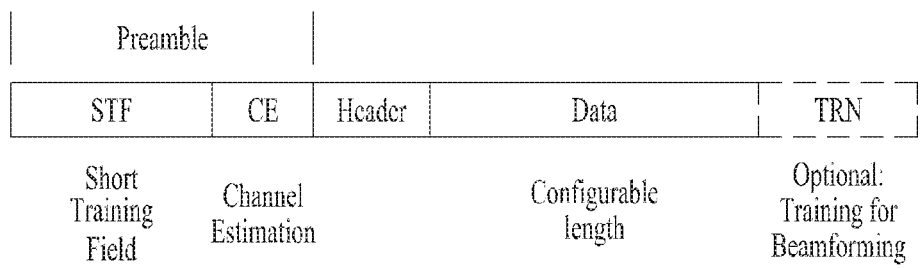
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
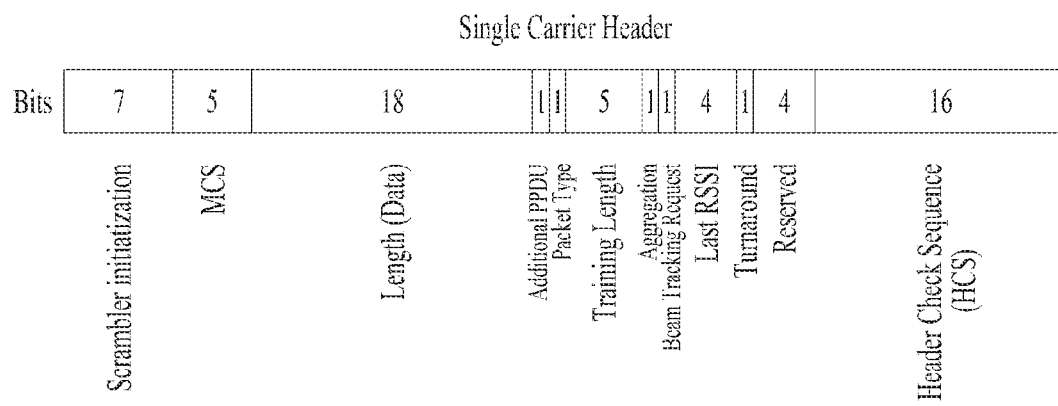
FIGS. 7 and 8 are diagrams illustrating configuration of the header field of the radio frame of FIG. 6.
Figures 8, 9:
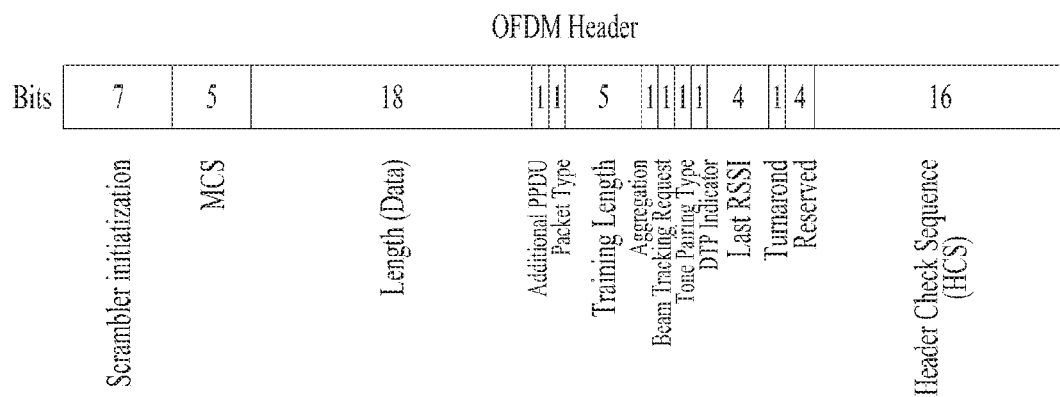
FIG. 9 is a diagram showing a PPDU structure applicable to the present invention.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

2. OFDM Frame Structure Applicable to the Present Invention

Prior to description of an OFDM frame structure applicable to the present invention, an OFDM frame structure defined in an IEEE 802.11ad system will be described.

Figure 10:
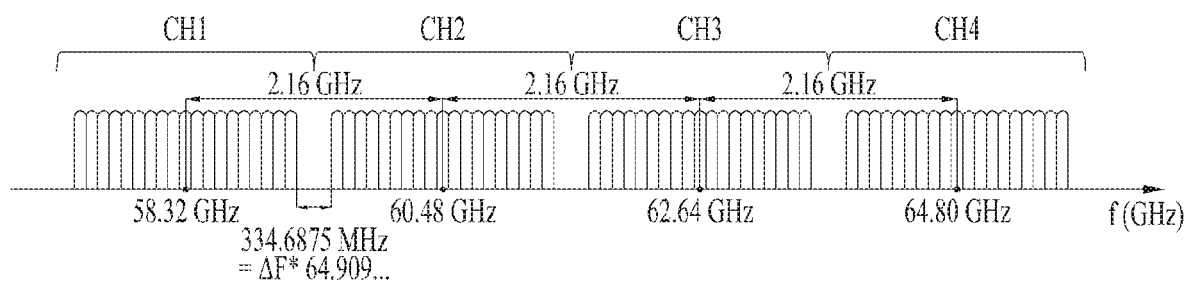
FIG. 10 is a diagram illustrating an OFDM frame structure defined in an IEEE 802.11ad system.

FIG. 10 is a diagram illustrating an OFDM frame structure defined in an IEEE 802.11ad system.

As shown in FIG. 10, the IEEE 802.11ad system has center frequencies of 58.32 GHz, 60.48 GHz, 62.64 GHz, and 64.80 GHz per four channels (each of which is 2.16 GHz). At this time, a bandwidth reserved by OFDM subcarriers in one channel is about 1.83 GHz, and a space of about 0.33 GHz (or 334.6875 MHz) exists between respective channels.

However, since the IEEE 802.11ay system suggested in the present invention supports maximum eight channels and channel bonding of one or more, a new OFDM frame structure having a wide bandwidth, which may support channel bonding, will be required.

Figure 11:
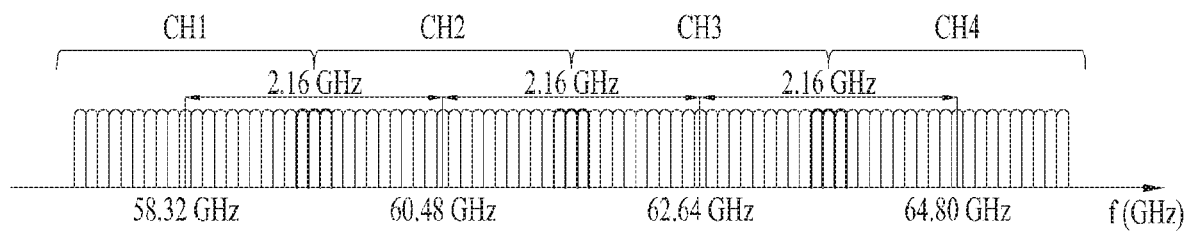
FIG. 11 is a diagram illustrating an OFDM frame structure applicable to the present invention.

In this case, for compatibility with the legacy UE (e.g., 11ad UE), the OFDM frame structure of FIG. 10 may be used, and an OFDM frame structure of FIG. 11 may be used as an example.

FIG. 11 is a diagram illustrating an OFDM frame structure applicable to the present invention.

As shown in FIG. 11, an example of an OFDM frame structure applicable to the present invention may include an OFDM frame structure in which each channel and a space between channels are filled with OFDM subcarriers. At this time, 5.15625 MHz may be applied to a value of the OFDM subcarrier spacing.

However, a space between channels in the 11ad system corresponds to 334.6875 MHz, and it is difficult to locate OFDM subcarriers of 5.1565 MHz in a corresponding space as much as a certain number. Therefore, an example of the OFDM frame structure applicable to the present invention may include the OFDM frame structure defined in the 11ad system, wherein positions of subcarriers are shifted to both sides based on a specific channel (CH2 or primary channel on the system), whereby a new OFDM frame structure that includes a plurality of channels (e.g., four channels) may be applied to the present invention. Although FIG. 11 illustrates an OFDM frame structure that includes four channels, the OFDM frame structure of the present invention may be applied to an OFDM frame structure that includes 6 channels or 8 channels. For example, in case of the OFDM frame structure that includes 8 channels, the corresponding OFDM structure may be configured by shifting positions of subcarriers based on CH4 or CH5.

In this case, the OFDM frame structure applicable to the present invention may maintain the existing OFDM subcarrier spacing, and may locate 66 new subcarriers in the space between channels. At this time, a center frequency spacing of each channel may be 2.165625 GHz.

The above configuration is characterized as follows.
A frequency spacing between the channels defined in the 11ad system is not configured by an integer multiple of the subcarrier spacing.
Therefore, OFDM tone plans shifted based on a center frequency of a specific channel (e.g., CH2) may be unified.
The number of DC tones in a tone plan for 2-channel to 4-channel bonding may be 3 or 5 in accordance with offset according to the shift. However, the number of the DC tones is only a numeric value suggested as an example, and may be set differently depending on implementation embodiments.

As another example, the OFDM frame structure of FIG. 11 may be defined based on FFT size and subcarrier spacing independent from the 11ad system. In this case, 66 OFDM subcarriers or other number of OFDM subcarriers may be located in the space between the channels.

An access point (AP) or 11ay UE may transmit data through a method such as single channel transmission, channel bonding, channel aggregation and multi-input multi-output (MIMO) by using the OFDM frame structure as shown in FIG. 11.

The 11ay system suggested in the present invention suggests that UEs having various capabilities (e.g., radio frequency (RF) size, the number of RFs, the number of antennas, channel switching capability, non-primary channel operation capability, etc.) should be designed to mutually transmit and receive data. The capability of the UE considered in this case means a capability for channel bonding or channel aggregation.

Hereinafter, an OFDM frame structure applicable to all of 11ay UEs having the same FFT size or 11ay UEs having different FFT sizes will be described in detail as the OFDM frame structure applicable to the present invention. If there is no special description, the OFDM structure of the present invention may be understood as the OFDM structure applicable to all of 11ay UEs having the same FFT size or flay UEs having different FFT sizes.

2.1. First Example

Figure 12:
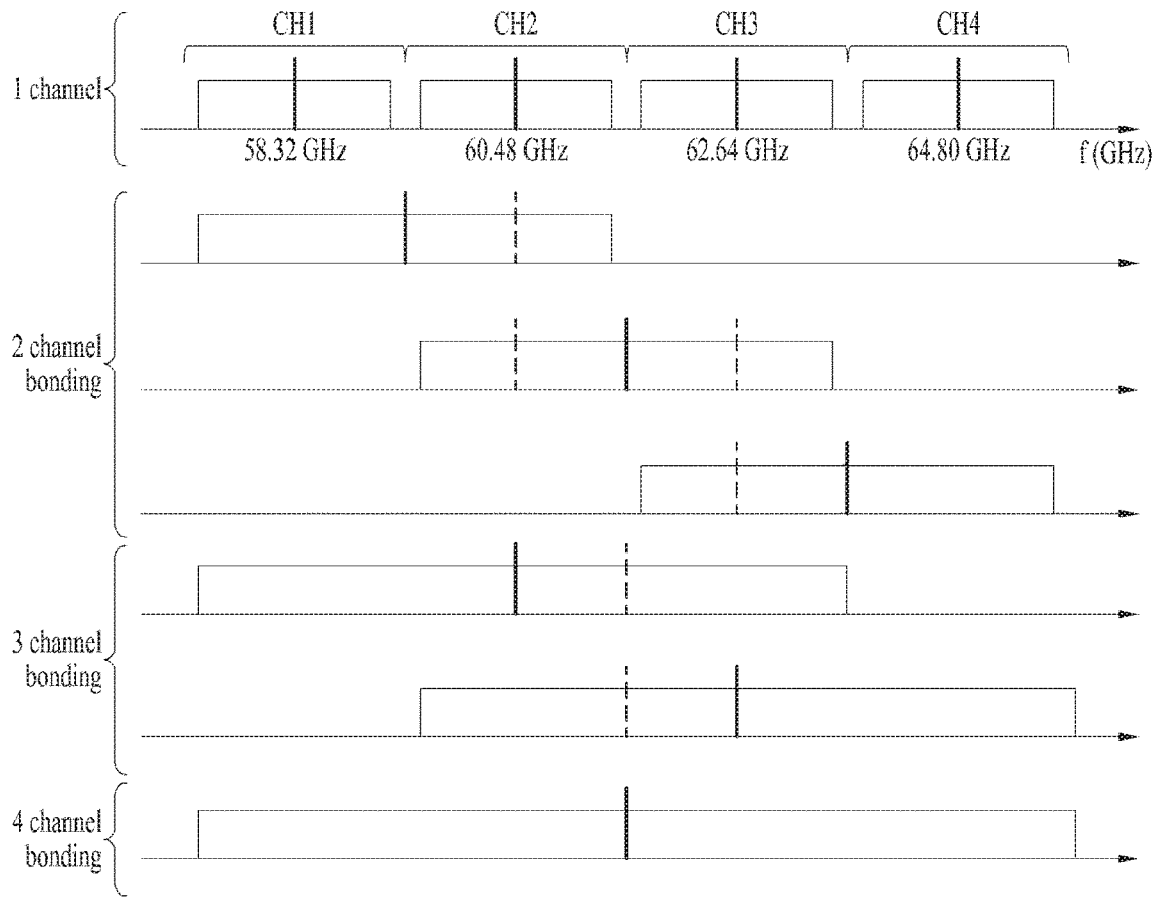
FIG. 12 is a diagram illustrating examples of an applicable OFDM frame structure considering channel bonding in accordance with the present invention.

FIG. 12 is a diagram illustrating examples of an applicable OFDM frame structure considering channel bonding in accordance with the present invention. In this case, FIG. 12 illustrates an OFDM frame structure based on the 11ay system that supports four channels, and the corresponding configuration of FIG. 12 may adaptively be applied to the case that the 11ay system suggested in the present invention may supports channels more than four channels, such as six channels or eight channels.

In FIG. 12, a structure marked with a rectangular type illustrates a frame structure used to transmit a data packet.

A dark solid line denotes a position of a direct tone (DC) required when an 11ay UE receives a frame corresponding to its capability, and a dotted line denotes a position of a DC required when an 11ay UE receives a frame corresponding to a bandwidth smaller than its capability. The dark solid line and the dotted line may be referred to as a first DC tone and a second DC tone, respectively.

Also, since a separate DC is not required for an empty space in FIG. 12 (since a separate signal is not defined in a corresponding space), it is to be understood by the person with ordinary skill in the art that a position of a DC is not marked separately.

In case of transmission based on 1 channel (2.16 GHz), the same OFDM frame structure may be configured regardless of a channel through which a signal is transmitted.

In case of transmission based on 2-channel bonding, as shown in FIG. 12, three types of OFDM frame structures may be considered in accordance with a channel through which 2-channel bonded signal is transmitted. In more detail, it is assumed that an flay UE having a 3-channel bonding capability receives a 2-channel bonded signal. At this time, in order that the 11ay UE having a 2-channel bonding capability properly receives the 2-channel bonded signal, DC should be located at a middle position of a case that CH1 to CH3 or CH2 to CH4 are bonded. Therefore, as shown in FIG. 12, the three types of OFDM frame structures may be applied to the OFDM frame structure according to transmission for 2-channel bonding in accordance with a channel which is transmitted.

In case of transmission based on 3-channel bonding, as shown in FIG. 12, two types of OFDM frame structures may be considered in accordance with channels through which a signal is transmitted. In more detail, the two types of OFDM frame structures shown in FIG. 12 may be considered considering the case that an 11ay UE having a 4-channel bonding capability receives a 3-channel bonded signal.

In case of transmission based on 4-channel bonding, the same OFDM frame structure may always be used.

2.2. Second Example

According to the first example described as above, since the OFDM frame structure is determined depending on a channel through which a signal bonded with one or more channels is transmitted, a problem may occur in that complexity is increased. Therefore, as the second example of the OFDM frame structure applicable to the present invention, an OFDM frame structure unified per frequency bandwidth (or per the number of bonded channels), which is a modified embodiment of the first example, may be used.

Figure 13:
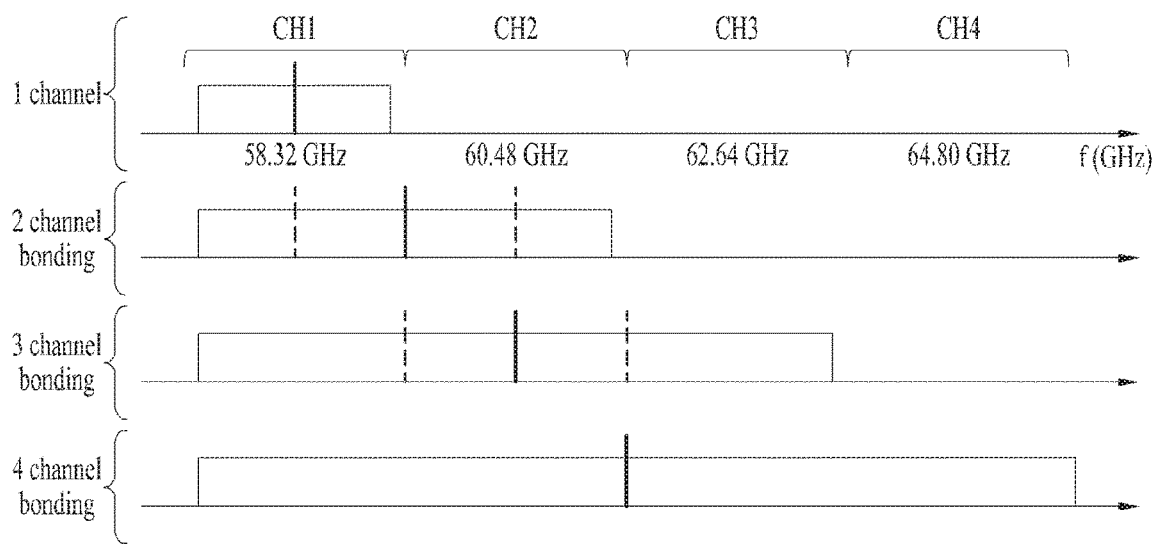
FIG. 13 is a diagram illustrating other examples of an applicable OFDM frame structure considering channel bonding in accordance with the present invention.

FIG. 13 is a diagram illustrating other examples of an applicable OFDM frame structure considering channel bonding in accordance with the present invention.

As shown in FIG. 13, a single OFDM frame structure may be used in accordance with the number of channels subjected to channel bonding.

Hereinafter, the OFDM frame structure applicable in accordance with each channel bonding will be described in detail.

2.2.1. 1-Channel Bonding

Figure 14:
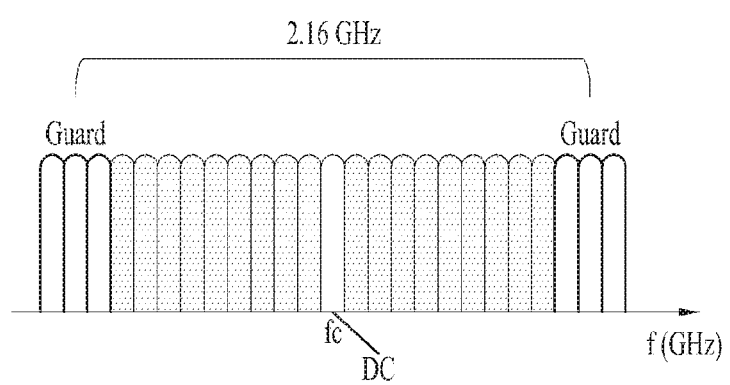
FIG. 14 is a diagram illustrating an OFDM frame structure for 1-channel bonding according to a second example of an OFDM frame structure applicable to the present invention.

FIG. 14 is a diagram illustrating an OFDM frame structure for 1-channel bonding according to a second example of an OFDM frame structure applicable to the present invention.

As shown in FIG. 14, as the OFDM frame structure for 1-channel bonding, an OFDM numerology or OFDM frame structure defined in the 11ad system may be reused considering compatibility with the legacy UE (e.g., 11ad UE).

At this time, the OFDM frame structure may include 355 subcarriers, which may include 3 DC tones (or subcarriers), 16 pilot tones (or subcarriers), and 336 data tones (or subcarriers).

In FIG. 14, $f_c$ means a center frequency, and DC means a certain number of tones (e.g., three tones) based on the center frequency of the channel. Guard tones may mean tones except the aforementioned 355 subcarriers when 512 FFT is applied.

2.2.2. 2-Channel Bonding

Figure 15:
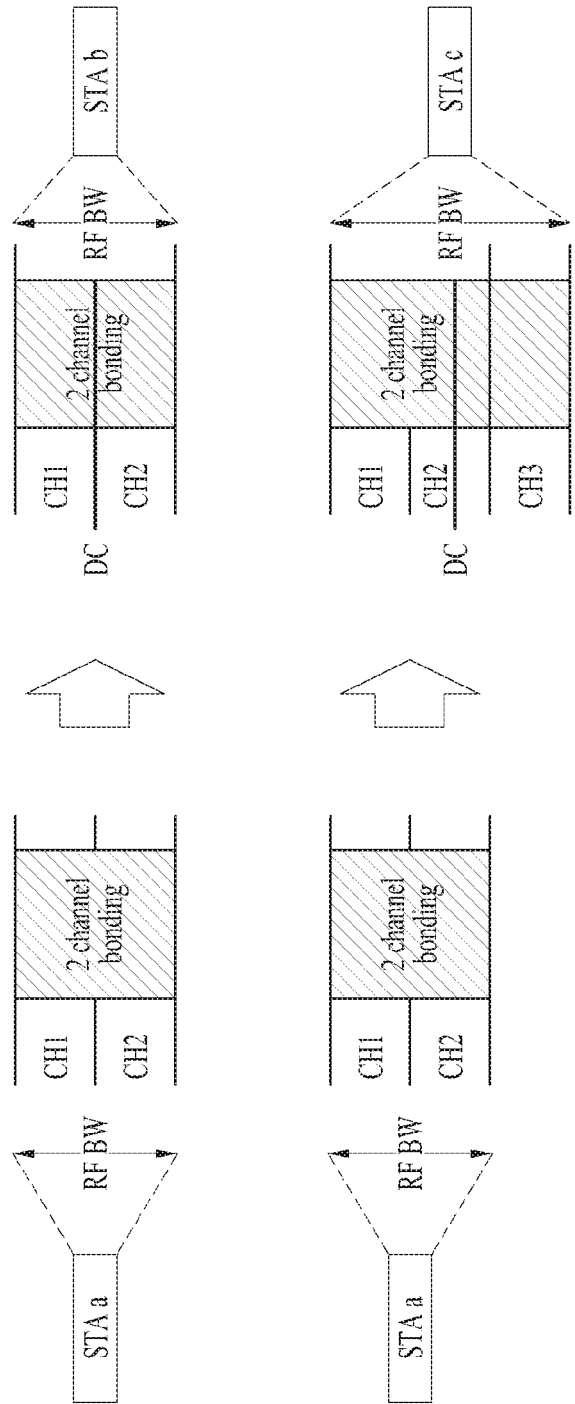
FIG. 15 is a diagram illustrating a position of a DC tone required in accordance with capability (e.g., FFT size) of a UE which receives 2-channel bonded signal.

As described in the first example, in case of 2-channel bonding, a position of DC tone which is required may be varied depending on capability (FFT size, etc.) of an 11ay UE which receives a corresponding signal. FIG. 15 is a diagram illustrating a position of a DC tone required in accordance with capability (e.g., FFT size) of a UE which receives 2-channel bonded signal.

As shown in FIG. 15, if the capability (e.g., FFT size) of the UE which receives a 2-channel bonded signal is the same as a bandwidth of 2-channel bonding (case 1 of FIG. 15), the DC tone is required to be located between two channels subjected to channel bonding, whereas if the capability (e.g., FFT size) of the UE which receives a 2-channel bonded signal is the same as a bandwidth of 3-channel bonding (case 2 of FIG. 15), the DC tone may be required to be located at the center of the bandwidth corresponding to three channels.

The OFDM frame structure for 2-channel bonding according to the present invention should satisfy all of the above cases. Therefore, the present invention suggests the OFDM frame structure for 2-channel bonding.

Figure 16:
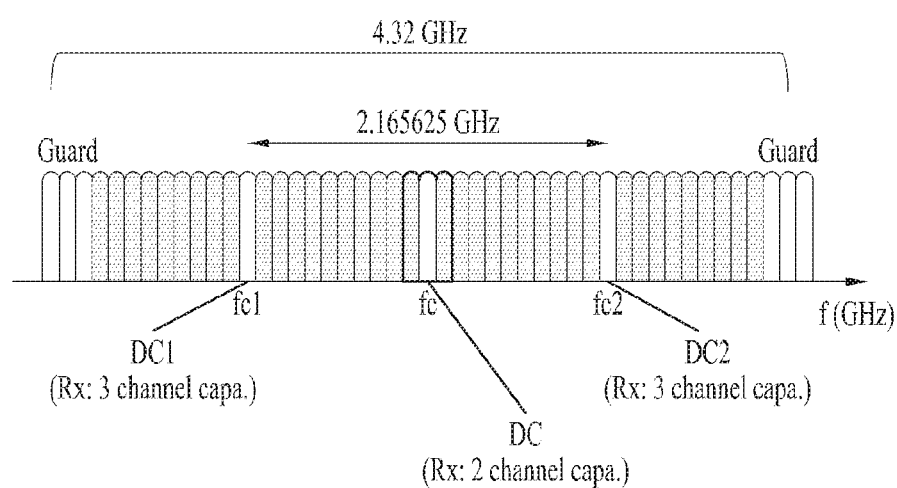
FIG. 16 is a diagram illustrating an OFDM frame structure for 2-channel bonding according to a second example of an OFDM frame structure applicable to the present invention.

FIG. 16 is a diagram illustrating an OFDM frame structure for 2-channel bonding according to a second example of an OFDM frame structure applicable to the present invention.

In FIG. 16, $f_c$ means a center frequency of a bandwidth corresponding to two channels, $f_{c1}$ means a center frequency of a left channel of the channels subjected to 2-channel bonding, and $f_{c2}$ means a center frequency of a right channel of the channels subjected to 2-channel bonding.

DC means a certain number of tones based on a center frequency of a bandwidth corresponding to two channels. DC1 means a certain number of tones based on the center frequency of the left channel of the channels subjected to 2-channel bonding, and DC2 means a certain number of tones based on the center frequency of the right channel of the channels subjected to 2-channel bonding.

For example, the number of tones corresponding to DC, DC1, and DC2 may be set to 3 based on the center frequency, may be set to 1 corresponding to the center frequency, or may be set to 5 based on the center frequency. Also, two of the three tones based on the center frequency may be configured.

2.2.3. 3-Channel Bonding

Figure 17:
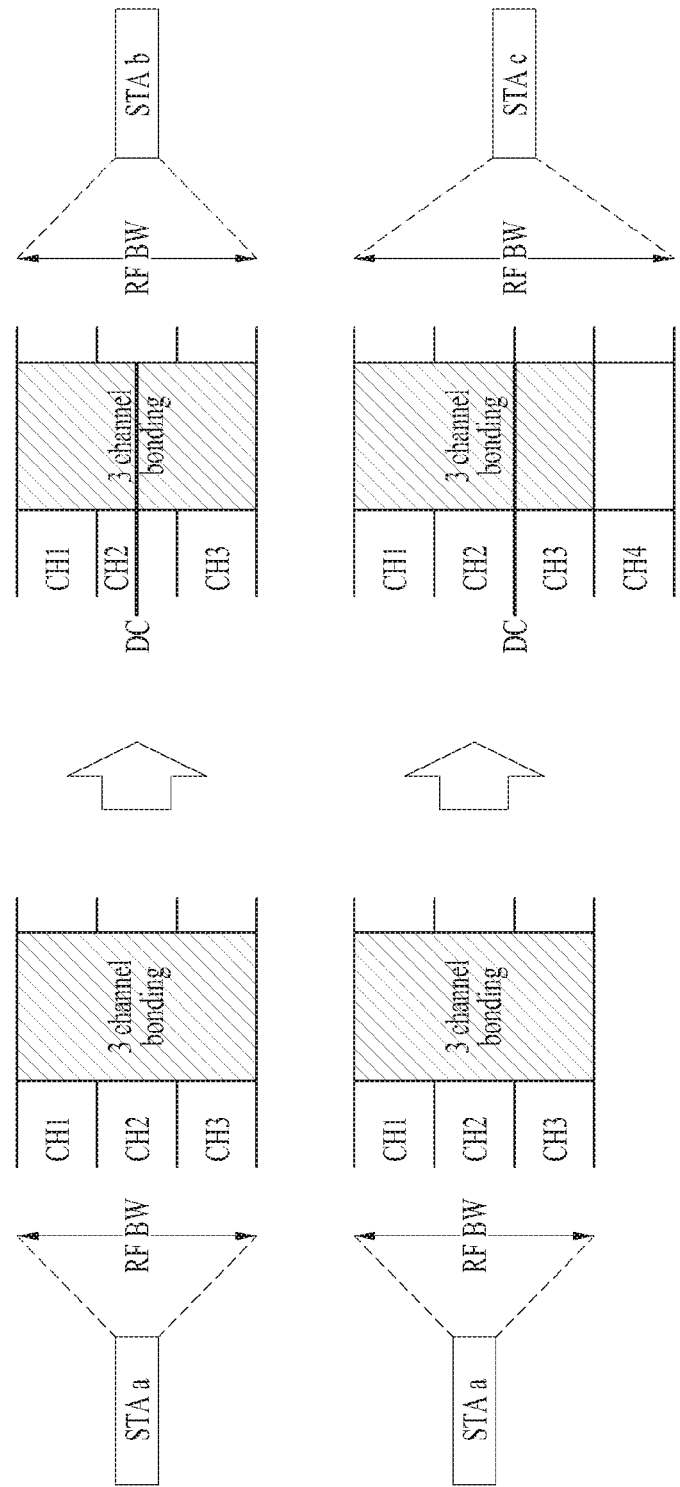
FIG. 17 is a diagram illustrating a position of a DC tone required in accordance with capability (e.g., FFT size) of a UE which receives 3-channel bonded signal.

As described in the first example, in case of 3-channel bonding, the position of the DC tone which is required may be varied depending on the capability (FFT size, etc.) of the 11ay UE which receives the corresponding signal. FIG. 17 is a diagram illustrating a position of a DC tone required in accordance with capability (e.g., FFT size) of a UE which receives 3-channel bonded signal.

As shown in FIG. 17, if the capability (e.g., FFT size) of the UE which receives a 3-channel bonded signal is the same as a bandwidth of 3-channel bonding (case 1 of FIG. 17), the DC tone is required to be located at the center of the bandwidth corresponding to three channels subjected to channel bonding, whereas if the capability (e.g., FFT size) of the UE which receives a 3-channel bonded signal is the same as a bandwidth of 4-channel bonding (case 2 of FIG. 17), the DC tone may be required to be located at the center of the bandwidth corresponding to four channels.

The OFDM frame structure for 3-channel bonding according to the present invention should satisfy all of the above cases. Therefore, the present invention suggests the OFDM frame structure for 3-channel bonding.

Figure 18:
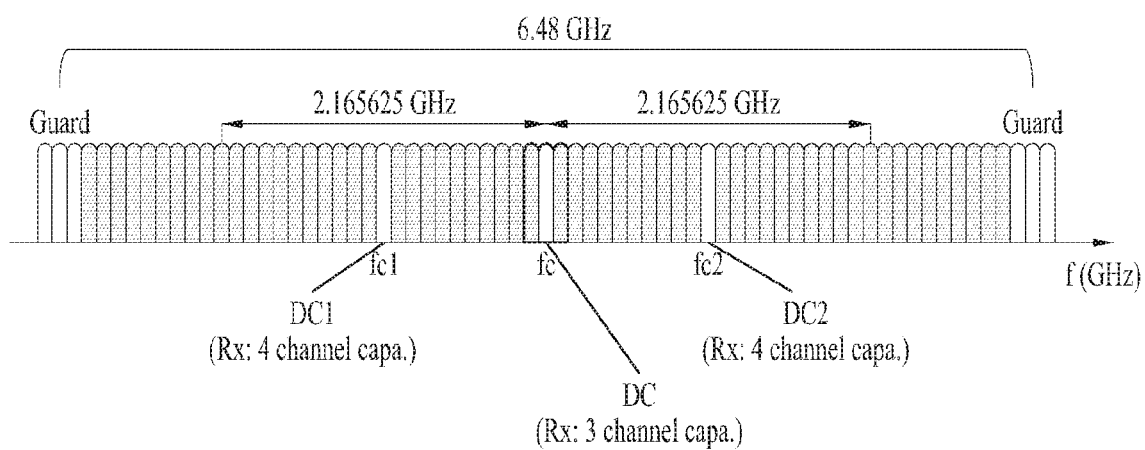
FIG. 18 is a diagram illustrating an OFDM frame structure for 3-channel bonding according to a second example of an OFDM frame structure applicable to the present invention.

FIG. 18 is a diagram illustrating an OFDM frame structure for 3-channel bonding according to the second example of an OFDM frame structure applicable to the present invention.

In FIG. 18, $f_c$ means a center frequency of a bandwidth corresponding to three channels, $f_{c1}$ means a center frequency between a first channel and a second channel from a left side of the channels subjected to 3-channel bonding, and $f_{c2}$ means a center frequency between a first channel and a second channel from a right side of the channels subjected to 3-channel bonding.

DC means a certain number of tones based on a center frequency of a bandwidth corresponding to three channels. DC1 means a certain number of tones based on the center frequency between the first channel and the second channel from the left side of the channels subjected to 3-channel bonding, and DC2 means a certain number of tones based on the center frequency between the first channel and the second channel from the right side of the channels subjected to 2-channel bonding.

For example, the number of tones corresponding to DC, DC1, and DC2 may be set to 3 based on the center frequency, may be set to 1 corresponding to the center frequency, or may be set to 5 based on the center frequency. Also, two of the three tones based on the center frequency may be configured.

2.2.4. 4-Channel Bonding

Figure 19:
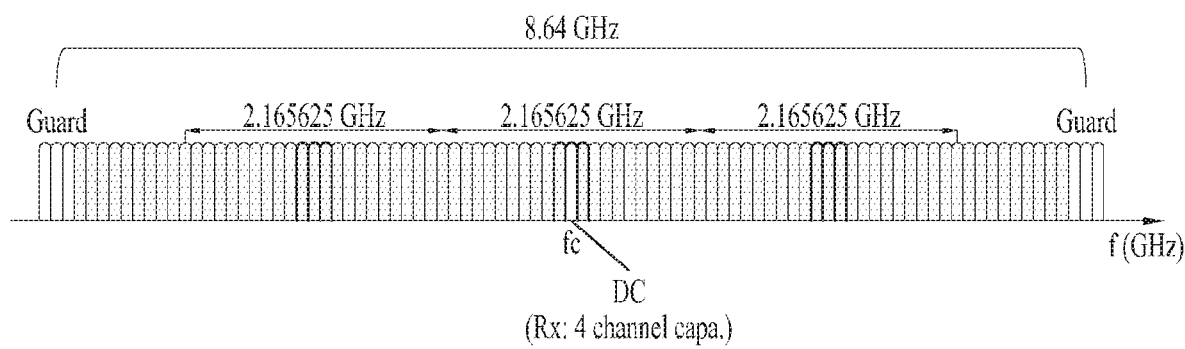
FIG. 19 is a diagram illustrating an OFDM frame structure for 4-channel bonding according to a second example of an OFDM frame structure applicable to the present invention.

FIG. 19 is a diagram illustrating an OFDM frame structure for 4-channel bonding according to a second example of an OFDM frame structure applicable to the present invention.

Since UEs having 4-channel bonding capability may only be used in an OFDM frame structure of a bandwidth corresponding to 4-channel bonding in FIG. 19, additional DC tones are not required unlike the OFDM frame structure for 2-channel bonding or the OFDM frame structure for 3-channel bonding.

In FIG. 19, $f_c$ means a center frequency of a bandwidth corresponding to four channels, and DC means a certain number of tones based on a center frequency of a bandwidth corresponding to four channels. For example, the number of tones corresponding to DC may be set to 3 based on the center frequency, may be set to 1 corresponding to the center frequency, or may be set to 5 based on the center frequency. Also, two of the three tones based on the center frequency may be configured.

3. FDMA Frame Structure Suggested in the Present Invention

Hereinafter, a Frequency Division Multiple Access (FDMA) frame structure for transmitting a signal to a plurality of UEs subjected to frequency division multiplexing (FDM) based on the aforementioned various OFDM frame structures will be described in detail.

At this time, a PCP/AP is exemplarily suggested as a transmission device for transmitting a signal in the FDMA frame structure, and an 11ay UE is exemplarily suggested as a reception device for receiving a signal transmitted in the FDMA frame structure. However, this is only an example for describing the features of the present invention in detail, and the transmission device and the reception device may be applied differently.

If the 802.11ay system according to the present invention supports FDMA, the present invention suggests an FDMS frame structure considering capability (e.g., channel bonding capability, FFT size, etc.) of the UE. In more detail, the present invention suggests an FDMA frame structure for each of a case (first method) that a reception FFT size of the UE is smaller than a transmission FFT size of a PCP/AP and a case (second method) that a reception FFT size of the UE is equal to a transmission FFT size of a PCP/AP.

3.1. First Method

Figure 20:
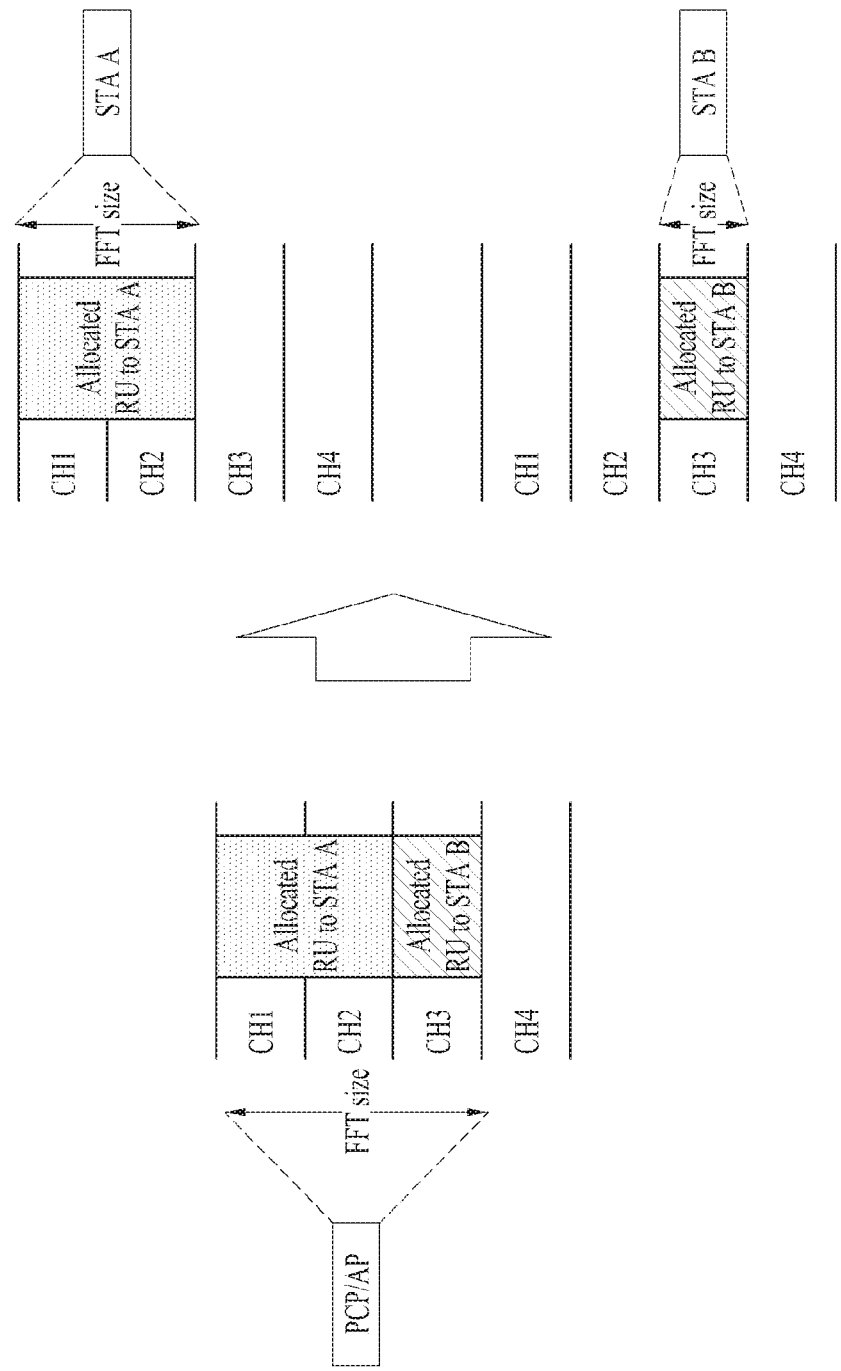
FIG. 20 is a diagram illustrating that a reception FFT size of a UE is smaller than a transmission FFT size of a PCP/AP.

FIG. 20 is a diagram illustrating that a reception FFT size of a UE is smaller than a transmission FFT size of a PCP/AP.

As shown in FIG. 20, the 11ay UE may have an FFT size different from that of the PCP/AP. For example, the PCP/AP may have an FFT size corresponding to three channels, whereas STA A may have an FFT size corresponding to two channels and STA B may have an FFT size corresponding to one channel.

In FIG. 20, the PCP/AP may transmit a data packet to the STA A and the STA B through a wideband (e.g., CH1, CH2, and CH3). At this time, the STA A and the STA B may decode a PPDU format (particularly, EDMG Header A) or control frame (e.g., RTS/CTS frame), which includes information on Resource Unit (RU) allocation, and then may receive the data packet by using the FFT size different from that of the PCP/AP.

As shown in FIG. 20, if the reception FFT size of the UE is different from that of the PCP/AP, an FDMA frame structure is required, in which a certain number of guard tones are located in a region between channels allocated to different UEs to reduce neighboring channel interference. Hereinafter, the FDMA frame structure separately applicable to each case will be described in detail.

3.1.1. Case that STA 1 Receives a Data Packet with 2-Channel FFT Size and STA 2 Receives a Data Packet with 1-Channel FFT Size FIG. 21 is a diagram illustrating an applicable FDMA frame structure in accordance with one embodiment of the present invention.

Figure 21:
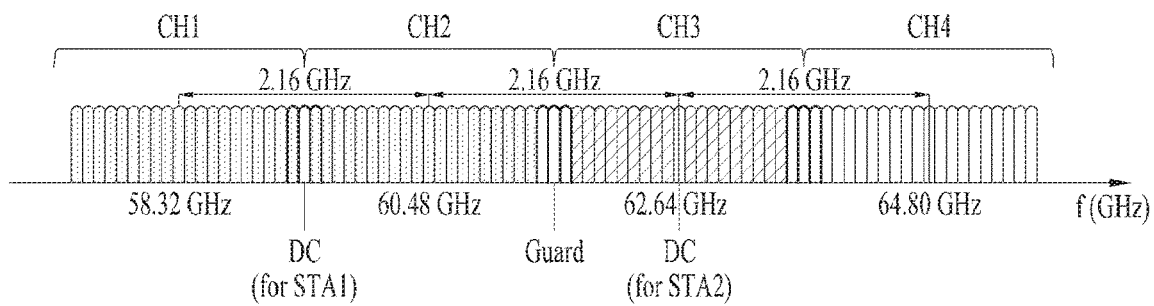
FIG. 21 is a diagram illustrating an applicable FDMA frame structure in accordance with one embodiment of the present invention.

As shown in FIG. 21, STA 1 may receive a data packet with 2 channel bonding (e.g., CH 1 and CH 2), and STA 2 may receive a data packet with 1 channel bonding (e.g., CH 3). At this time, in the FDMA frame structure which is applied, a region between CH1 and CH2 may be used as a first DC for the STA 1. Also, in the FDMA frame structure, a middle region of CH 3 may be used as a second DC for the STA 2. At this time, the first DC and the second DC may include a certain number of tones, and may include the same number of tones or their respective tones different from each other.

Additionally, in the FDMA frame structure, a guard tone may be included in a region between CH 1 and CH 2 allocated to the STA 1 and CH 3 allocated to the STA.

At this time, if the number of tones used as the guard tones is matched with tone plans to which channel bonding is applied, the following advantages are obtained. In detail, the STA 1 receives a signal (e.g., payload) based on the frame structure of 2-channel bonding and the STA 2 receives a signal (e.g., payload) based on the frame structure of 1-channel transmission. That is, if the number of tones used as the guard tones is matched with tone plans to which channel bonding is applied, the tone plan used for channel bonding may be reused in the FDMA frame structure.

3.1.2. Case that STA 1 Receives a Data Packet with 2-Channel FFT Size and STA 2 Receives a Data Packet with 1-Channel FFT Size, Wherein Additional DC is Included in a Corresponding FDMA Frame Structure FIG. 22 is a diagram illustrating an applicable FDMA frame structure in accordance with another embodiment of the present invention.

Figure 22:
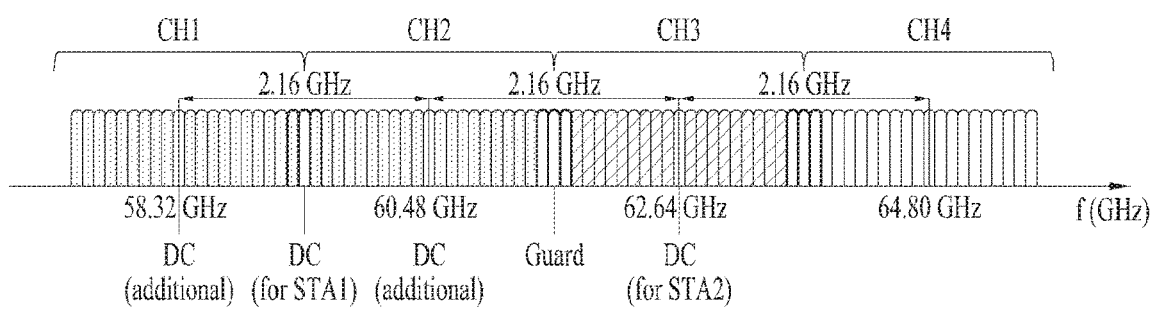
FIG. 22 is a diagram illustrating an applicable FDMA frame structure in accordance with another embodiment of the present invention.

FIG. 22 illustrates an FDMA frame structure where a center (or middle region) of each of channel 1 and channel 2 is used as additional DC unlike the FDMA frame structure shown in FIG. 21. In other words, FIG. 22 illustrates an FDMA frame structure where a certain number of DC tones are located in a position corresponding to a center frequency per channel.

At this time, if the number of tones used as the guard tones is matched with tone plans to which channel bonding is applied, the following advantages are obtained. In detail, the STA 1 receives a signal (e.g., payload) based on the frame structure of 2-channel bonding and the STA 2 receives a signal (e.g., payload) based on the frame structure of 1-channel transmission. That is, if the number of tones used as the guard tones is matched with tone plans to which channel bonding is applied, the tone plans used for channel bonding may be reused in the FDMA frame structure.

In more detail, the aforementioned FDMA frame structure may be determined based on the aforementioned OFDM frame structure according to the second example applicable to the present invention. That is, the FDMA frame structure for transmitting a signal to the STA 1 and the STA 2 may be applied based on the OFDM frame structure (FIG. 16) for 2-channel bonding corresponding to the STA 1 to which two channels are allocated and the OFDM frame structure (FIG. 14) for 1-channel transmission corresponding to the STA 2 to which one channel is allocated.

Figure 23:
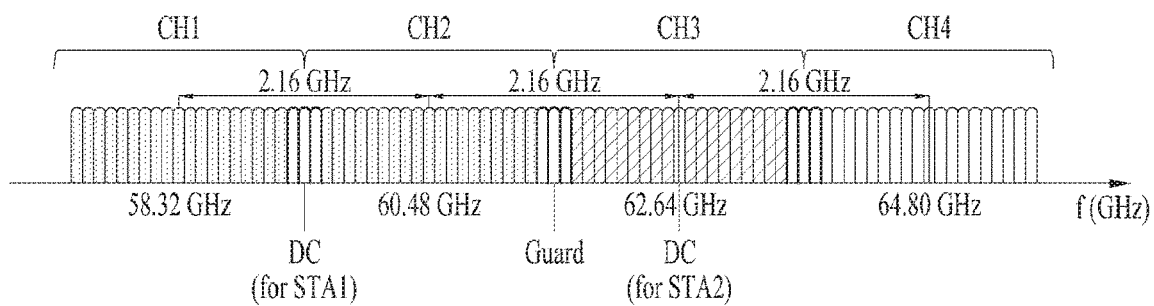
FIG. 23 is a diagram illustrating an applicable FDMA frame structure in accordance with still another embodiment of the present invention.

3.1.3. Case that STA1 Receives a Data Packet with 2-Channel Aggregation with One RF Unit and STA 2 Receives a Data Packet with 1-Channel FFT Size FIG. 23 is a diagram illustrating an applicable FDMA frame structure in accordance with still another embodiment of the present invention.

In the FDMA frame structure of FIG. 22, a region between CH1 and CH2 may be used as a first DC for STA 1 and a middle region of CH 3 may be used as a second DC for STA 2 in the same manner as the FDMA frame structure of FIG. 21. At this time, if signal transmission to the STA 1 is channel aggregation transmission, it is preferable that the tones between the channel 1 and the channel 2, which are allocated to the STA 1, are used as DC and also used as the guard tones to reduce neighboring channel interference. Therefore, the number of tones used as DC tones between the channel 1 and the channel 2 may be set based on the greater value of the number of DC tones for the STA 1 and the number of guard tones for channel aggregation transmission.

At this time, if the number of tones used as the guard tones is matched with tone plans to which channel bonding is applied, the following advantages are obtained. In detail, the STA 1 receives a signal (e.g., payload) based on the frame structure of 2-channel bonding and the STA 2 receives a signal (e.g., payload) based on the frame structure for 1-channel transmission. That is, if the number of tones used as the guard tones is matched with tone plans to which channel bonding is applied, the tone plans used for channel bonding may be reused in the FDMA frame structure.

3.1.4. Case that STA 1 Receives a Data Packet with 2-Channel Aggregation with One RF Unit and STA 2 Receives a Data Packet with 1-Channel FFT Size, Wherein Additional DC is Included in a Corresponding FDMA Frame Structure FIG. 24 is a diagram illustrating an applicable FDMA frame structure in accordance with further still another embodiment of the present invention.

Figure 24:
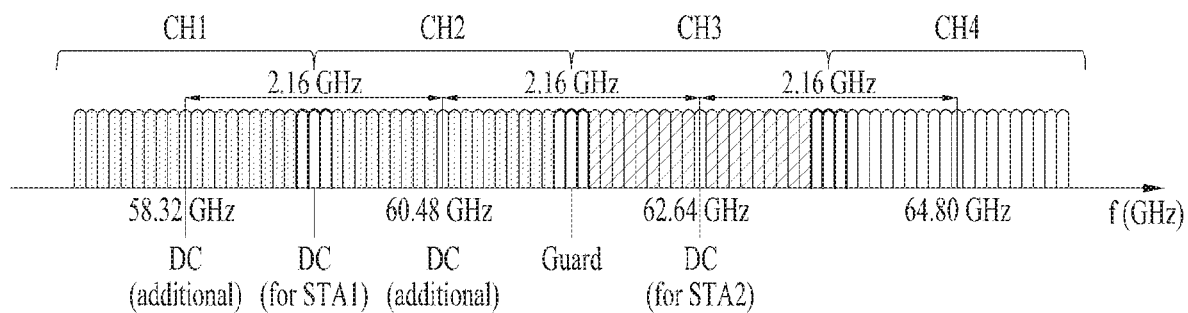
FIG. 24 is a diagram illustrating an applicable FDMA frame structure in accordance with further still another embodiment of the present invention.

The FDMA frame structure of FIG. 24 is configured considering the FDMA frame structure of FIG. 22 and the FDMA frame structure of FIG. 23, and may include additional DC in a position of a center frequency of each of CH 1 and CH 2.

At this time, if signal transmission to the STA 1 is channel aggregation transmission, it is preferable that the tones between the channel 1 and the channel 2, which are allocated to the STA 1, are used as DC and also used as the guard tones to reduce neighboring channel interference. Therefore, the number of tones used as DC tones between the channel 1 and the channel 2 may be set based on the greater value of the number of DC tones for the STA 1 and the number of guard tones for channel aggregation transmission.

At this time, if the number of tones used as the guard tones is matched with tone plans to which channel bonding is applied, the following advantages are obtained. In detail, the STA 1 receives a signal (e.g., payload) based on the frame structure of 2-channel bonding and the STA 2 receives a signal (e.g., payload) based on the frame structure for 1-channel transmission. That is, if the number of tones used as the guard tones is matched with tone plans to which channel bonding is applied, the tone plans used for channel bonding may be reused in the FDMA frame structure.

It is advantageous in that the aforementioned FDMA frame structure may be configured in the same structure as the OFDM frame structure applied to each UE regardless of capability (e.g., channel bonding capability, FFT size, etc.) of the UE and resource allocation to the UE.

3.1.5. Case that STA 1 Receives a Data Packet with 2-Channel Aggregation with Two RF Units and STA 2 Receives a Data Packet with 1-Channel FFT Size FIG. 25 is a diagram illustrating an applicable FDMA frame structure in accordance with further still another embodiment of the present invention.

Figure 25:
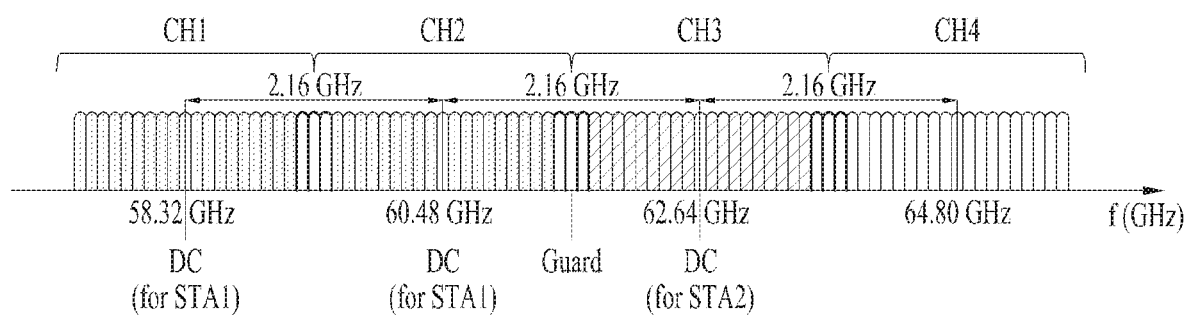
FIG. 25 is a diagram illustrating an applicable FDMA frame structure in accordance with further still another embodiment of the present invention.

As shown in FIG. 25, an FDMA frame structure where a certain number of DC tones for STA 1 are located in a middle region between CH 1 and CH 2 may be applied to one embodiment of the present invention. Also, in one embodiment, an FDMA frame structure where a certain number of DC tones for STA 2 are located in a region corresponding to a center frequency of CH 3 may be applied to one embodiment of the present invention.

Particularly, in case of channel aggregation transmission, since channel aggregation is supported by two RFs, one or more tones located between CH 1 and CH 2 may be used as the guard tones to reduce neighboring channel interference.

At this time, if the number of tones used as the guard tones is matched with tone plans to which channel bonding is applied, the following advantages are obtained. In detail, the STA 1 receives a signal (e.g., payload) based on the frame structure of 2-channel bonding and the STA 2 receives a signal (e.g., payload) based on the frame structure for 1-channel transmission. That is, if the number of tones used as the guard tones is matched with tone plans to which channel bonding is applied, the tone plans used for channel bonding may be reused in the FDMA frame structure.

3.2. Second Method

Figure 26:
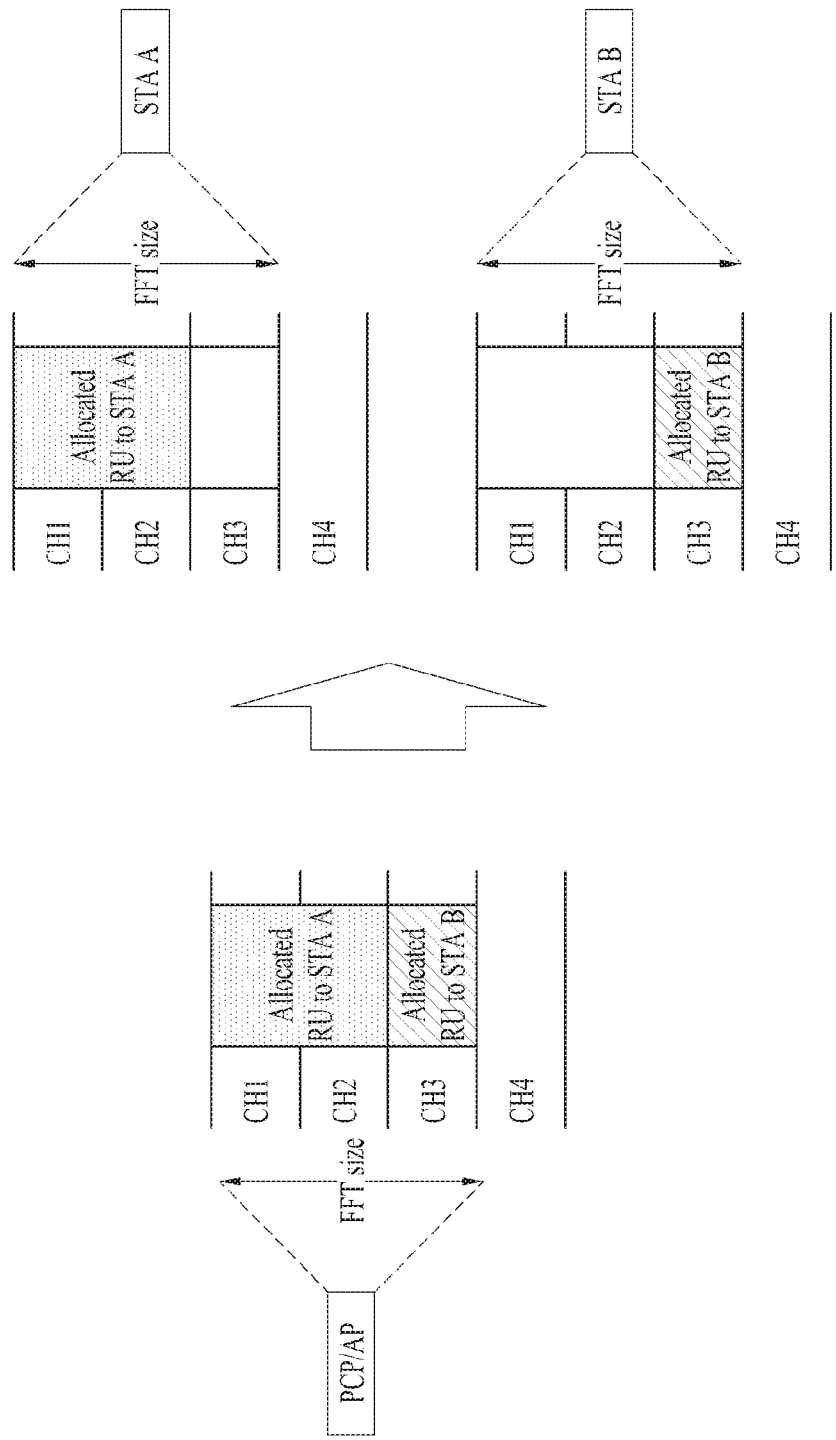
FIG. 26 is a diagram illustrating that a reception FFT size of a UE is equal to a transmission FFT size of a PCP/AP.

FIG. 26 is a diagram illustrating that a reception FFT size of a UE is equal to a transmission FFT size of a PCP/AP.

As shown in FIG. 26, the 11ay UE may have the same FFT size as that of the PCP/AP. For example, the PCP/AP, STA A and STA B may have FFT sizes corresponding to three channels.

In this case, a certain number of tones (e.g., guard tones) for reducing neighboring channel interference are not required between channels respectively allocated to the UEs having the same FFT size. In other words, in the FDMA frame structure applied in FIG. 26, a separate guard tone is not located in a region between the channels respectively allocated to the UEs. Hereinafter, the corresponding FDMA frame structure will be described in detail.

3.2.1. Case that STA 1 and STA 2 Receive an FDMA Data Packet by Using the Same FFT Size as that of PCP/AP or STA which Transmits the FDMA Data Packet FIG. 27 is a diagram illustrating an FDMA frame structure in accordance with further still another embodiment of the present invention.

Figure 27:
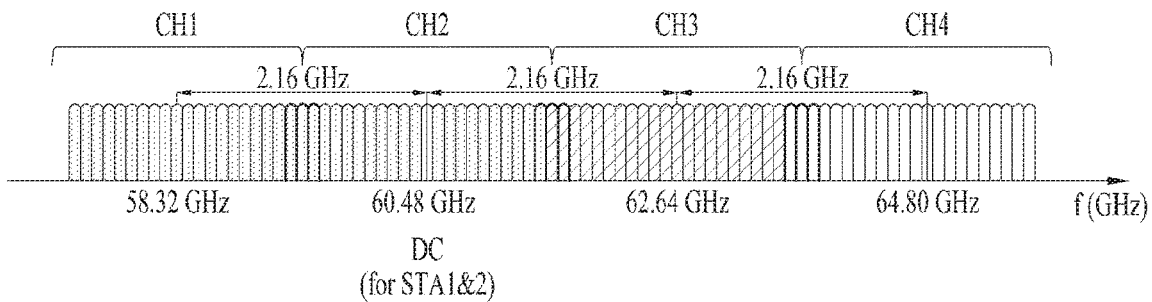
FIG. 27 is a diagram illustrating an FDMA frame structure in accordance with further still another embodiment of the present invention.

In FIG. 27, it is assumed that the STA 1 and the STA 2 receive an FDMA data packet by using the same FFT size as that of the PCP/AP or the STA, which transmits the FDMA data packet. At this time, resources corresponding to two channels (e.g., CH 1 and CH 2) may be allocated to the STA 1, and resources corresponding to one channel (e.g., CH 3) may be allocated to the STA 2.

As shown in FIG. 27, since the PCP/AP and the STA which join FDMA have the same capability (e.g., channel bonding capability, FFT size, etc.), a certain number of DC tones may be applied to only a center position of a frequency domain to which FFT is applied in the FDMA frame structure applied for data packet transmission from the PCP/AP or another STA.

In this case, the aforementioned FDMA frame structure is advantageous in view of the PCP/AP that the tone plans used for channel bonding may be reused as they are.

Also, as shown in FIG. 27, the same number of tones or different number of tones (tones newly defined for wideband transmission in 11ay) between CH 2 and CH 3 may be allocated to the STA 1 and the STA 2 depending on how RU size is set.

3.2.2. Case that STA 1 and STA 2 Receive an FDMA Data Packet by Using the Same FFT Size as that of PCP/AP or STA which Transmits the FDMA Data Packet, Wherein the Same Tone Plan as that of Channel Bonding is Applied in View of UE which Receives the FDMA Data Packet FIG. 28 is a diagram illustrating an FDMA frame structure in accordance with further still another embodiment of the present invention.

Figure 28:
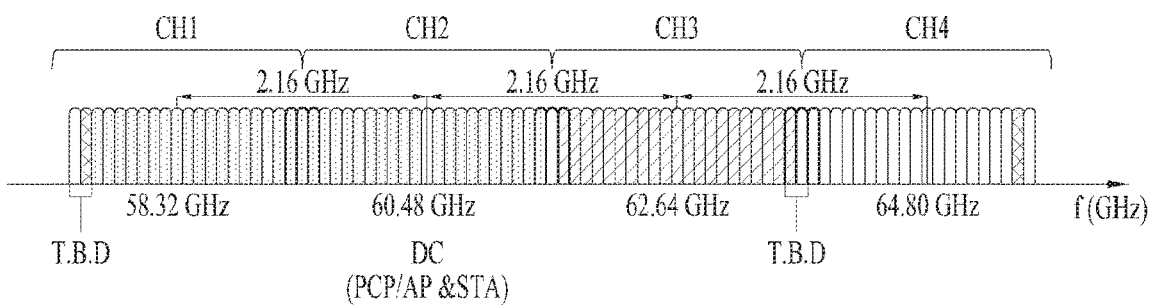
FIG. 28 is a diagram illustrating an FDMA frame structure in accordance with further still another embodiment of the present invention.

In order that the same tone plan as that of channel bonding is applied in view of the UE which receives the FDMA data packet, the FDMA frame structure shown in FIG. 28 may be considered.

If channel bonding is performed in the 802.11 ay system applicable to the present invention, data may be transmitted using subcarriers (or tones) more than the number of subcarriers (or the number of tones) for data transmission of the related art. In this case, subcarriers (or tones) for data newly defined at both ends of each channel may be used for single channel transmission/channel bonding/channel aggregation.

At this time, the UE may receive data by recognizing the number of tones, which have the same size as that when channel bonding is applied in an FDMA status, as RU. In other words, the UE may receive the data by reusing the OFDM tone plans defined in the 11ay without newly defining RU size for FDMA. This feature may be applied to all the FDMA frame structures according to one embodiment as above.

3.2.3. Case that STA 1 and STA 2 Receive an FDMA Data Packet by Using the Same FFT Size as that of PCP/AP or STA which Transmits the FDMA Data Packet, Wherein Additional DC is Included in a Corresponding FDMA Frame Structure FIG. 29 is a diagram illustrating an FDMA frame structure in accordance with further still another embodiment of the present invention.

Figure 29:
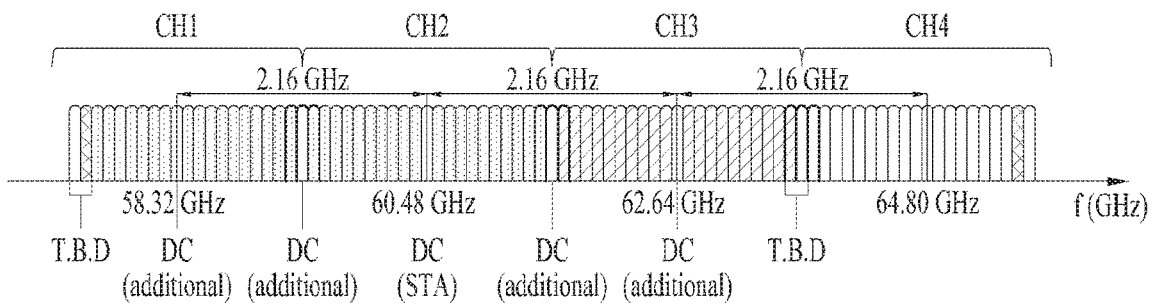
FIG. 29 is a diagram illustrating an FDMA frame structure in accordance with further still another embodiment of the present invention.

In FIG. 29, it is assumed that the STA 1 and the STA 2 receive an FDMA data packet by using the same FFT size as that of the PCP/AP or the STA, which transmits the FDMA data packet. At this time, resources corresponding to two channels (e.g., CH 1 and CH 2) may be allocated to the STA 1, and resources corresponding to one channel (e.g., CH 3) may be allocated to the STA 2.

Additionally, in the FDMA frame structure according to one embodiment, additional DC may be included in a position corresponding to a center frequency of CH 1, a position corresponding to a center frequency of CH 3 and a region between neighboring channels. In this case, it is advantageous in that each of the OFDM frame structure and the FDMA frame structure may be configured in a single structure.

Also, the FDMA frame structure suggested in the first method may be applied to the case that the reception FFT size of the UE is the same as the transmission FFT size of the PCP/AP as assumed in the second method of the present invention.

Also, the aforementioned FDMA frame structures may be applied to 1, 2, 3 and 4-channel bonding in the same manner.

4. Additional Embodiment

As described above, the 802.11ay system suggested in the present invention suggests a channel bonding method for transmitting data by simultaneously using a plurality of channels and a channel aggregation method.

That is, since the 802.11 ay system considers multi-channels, it is required to newly define a beamforming method which can support multi-channels.

As a method for configuring beamforming for multi-channels, a method for applying a beamforming resultant value for a primary channel to one or more secondary channels may be considered. However, since the beamforming resultant values may be different per channel, efficiency of this beamforming method may be low.

Therefore, the present invention suggests a new beamforming method for multi-channels. At this time, the aforementioned OFDM frame structure, the aforementioned FDMA frame structure, etc. may be applied to the above method, and the method may be applied independently without application of the aforementioned OFDM frame structure and the aforementioned FDMA frame structure. In other words, the beamforming method for multi-channels may be implemented independently from the aforementioned frame structure.

Figure 30:
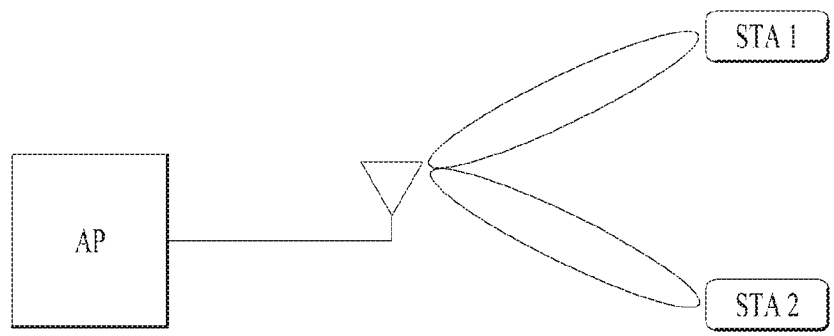
FIG. 30 is a diagram illustrating beamforming performed, by a PCP/AP, for a plurality of UEs.

FIG. 30 is a diagram illustrating beamforming performed, by a PCP/AP, for a plurality of UEs.

As shown in FIG. 30, if the PCP/AP transmits and receives a signal to and from a plurality of UEs, each UE may acquire a beamforming result for a primary channel through a Sector Level Sweep (SLS) or Beam Refinement Protocol (BRP) procedure. Through this configuration, the PCP/AP may support the legacy UE (e.g., 11ad UE).

At this time, FIG. 30 illustrates a beamforming result acquired by each UE after the SLS or BRP procedure. As shown in FIG. 30, best sectors of STA1 and STA2 may be different from each other.

Subsequently, in order that the PCP/AP transmits a signal to the STA 1 through a channel bonding method using a plurality of channels, additional beamforming is required. As detailed methods for this additional beamforming, the following methods may be used.

1) The PCP/AP or the UE may separately perform beamforming for additional channels used for channel bonding except the primary channel. In more detail, the PCP/AP or the UE may perform beamforming by acquiring the beamforming result through the SLS or BRP procedure for each channel.

2) The PCP/AP or the UE may perform beamforming for only a certain number of sectors based on the best sector acquired through the primary channel. In more detail, if the best sector is determined through the primary channel, the PCP/AP or the UE may perform beamforming by acquiring the beamforming result through the SLS or BRP procedure for several adjacent sectors based on the best sector. The 802.11 ay system to which the present invention is applicable supports 60 GHz bandwidth. This is because that a channel at the bandwidth of 60 GHz is flat and thus the beamforming result of the primary channel may be used to the maximum range to acquire a beamforming result of another channel.

3) The PCP/AP or the UE may transmit and frame Sector Sweep (SSW) frame or BRP frame through channel bonding transmission for all channels used for channel bonding and perform beamforming using a wide bandwidth.

The above various beamforming methods may be performed at various timing points. For example, the beamforming method for multi-channels may be performed just after the SLS procedure through the primary channel. At this time, PCP/AP may simultaneously support the legacy UE (e.g., had UE) and the hay UE through the SLS procedure through the primary channel. For another example, the beamforming method for multi-channels may be performed before channel bonding or channel aggregation transmission for DTI interval.

Preferably, the aforementioned beamforming for multi-channels may be performed just before channel bonding or channel aggregation transmission for DTI interval for actually transmitting data from the ACP/AP or the UE.

The beamforming result acquired through the aforementioned methods may be used for FDMA transmission. Therefore, the PAC/AP or the UE may use the result acquired through one or more of the aforementioned methods to form a beam pattern for FDMA transmission. Subsequently, the PCP/AP or the UE may transmit the FDMA frame by forming beam patterns of several directions through a best sector per UE, which is acquired by one array antenna through the aforementioned method.

The aforementioned signal transmission method may be summarized as follows. Hereinafter, a signal transmission entity is limited to the PCP/AP but the present invention also includes that a corresponding operation is performed even by a separate UE (e.g., station).

The PCP/AP transmits a signal to a plurality of stations (e.g., first STA and second STA) in accordance with an FDMA method. To this end, the PCP/AP determines an FDMA frame structure based on one or more first channels allocated to the first STA and one or more second channels allocated to the second STA, and transmits the signal to the first STA and the second STA based on the determined FDMA frame structure.

At this time, as shown in FIGS. 21 to 25 and FIG. 29, the determined FDMA frame structure may include a first direction current (DC) tone located at the center of a first frequency band corresponding to the one or more first channels allocated to the first STA and a second DC tone located at the center of a second frequency band corresponding to the one or more second channels allocated to the second STA.

In the present invention, the aforementioned FDMA frame structure may be applied to the case that the transmission FFT size of the PCP/AP is different from the reception FFT size of the first STA and the second STA. However, the FDMA frame structure like the example of FIG. 29 may be applied to even the case that the transmission FFT size of the PCP/AP is the same as the reception FFT size of the first STA and the second STA.

In this way, if the transmission FFT size of the PCP/AP is different from the reception FFT size of the first STA and the second STA, the FDMA frame structure may further include one or more guard tones in a region between the first frequency band and the second frequency band to cancel or minimize neighboring channel interference as shown in FIGS. 21 to 25.

At this time, each of the first DC tone and the second DC tone may include one or more tones, and the number of tones included in the first DC tone may be the same as or different from the number of tones included in the second DC tone.

Also, as shown in FIGS. 22, 24, 25 and 29, if there are a plurality of the first channels, the FDMA frame structure may include additional DC tone located at the center of each of the first channels. At this time, as a position of the additional DC tone, a position corresponding to the center frequency of each of the first channels may be used.

4. Device Configuration

Figure 31:
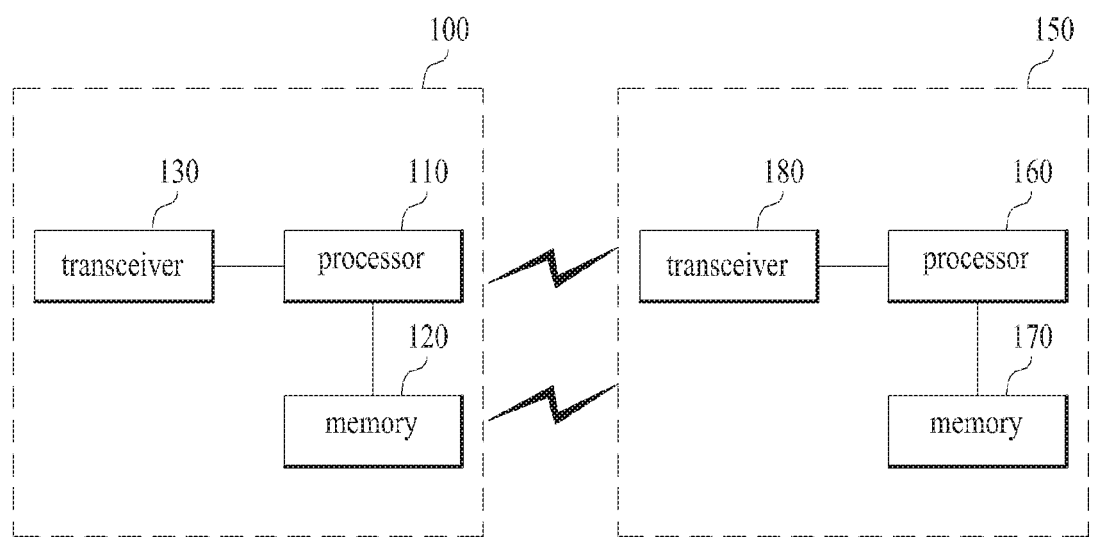
FIG. 31 is a diagram illustrating a device for implementing the aforementioned method.

FIG. 31 is a diagram illustrating devices for implementing the above-described method.

A wireless device 100 of FIG. 31 may correspond to a station for transmitting a signal based on the OFDM frame structure defined in the aforementioned description, and a wireless device 150 may correspond to a station for transmitting a signal based on the OFDM frame structure defined in the aforementioned description. Preferably, the station for transmitting a signal may correspond to the PCP/AP, and the station for receiving a signal may correspond to the 11ay UE. Hereinafter, for convenience of description, the station for transmitting a signal is referred to as a transmission device 100, and the station for receiving a signal is referred to as a reception device 150.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although the present invention has been described on the assumption that the present invention is applied to IEEE 802.11 based wireless LAN system, the present invention is not limited thereto. The present invention may be applied to various wireless systems, which can perform data transmission based on channel bonding, in the same manner.

What is claimed is:

1. A method of transmitting a signal by an access point (AP) to a first station (STA) and a second STA based on a frequency division multiple access (FDMA) method in a wireless local area network (WLAN) system, the method comprising:
   determining a FDMA frame structure based on one or more first channels allocated to the first STA and one or more second channels allocated to the second STA; and
   transmitting the signal to the first STA and the second STA based on the determined FDMA frame structure,
   wherein, based on determination that a transmission Fast Fourier Transform (FFT) size of the AP is different from a reception FFT size of the first STA and the second STA, the FDMA frame structure is determined to include (i) one or more first direct current (DC) tones located at a center of a first frequency band including the one or more first channels, (ii) one or more second DC tones located at a center of a second frequency band including the one or more second channels, and (iii) one or more guard tones located between the one or more first channels and the one or more second channels, and
   wherein, based on determination that (i) the transmission FFT size of the AP is same as the reception FFT size of the first STA and the second STA and (ii) the one or more first channels and the one or more second channels are contiguous, the FDMA frame structure is determined to include one or more third DC tones located at a center of a third frequency band including both the one or more first channels and the one or more second channels.

2. The method of claim 1, wherein a number of the first DC tones is the same as a number of the second DC tones.

3. The method of claim 1, wherein a number of the first DC tones is different from a number of the second DC tones.

4. The method of claim 1, wherein, based on determination that (i) a number of the first channels are plural and (ii) the transmission FFT size of the AP is different from the reception FFT size of the first STA and the second STA, the FDMA frame structure is determined to include additional DC tones located at a center of each of the first channels.

5. An access point (AP) device for transmitting a signal in a wireless local area network (WLAN) system, the AP device comprising:
   a transceiver having one or more radio frequency (RF) chains, configured to transmit and receive a signal to and from a first station (STA) and a second STA based on a frequency division multiple access (FDMA) method; and
   a processor connected with the transceiver, processing signal transmission and reception with the first STA and the second STA,
   wherein the processor is configured to:
   determine a FDMA frame structure based on one or more first channels allocated to the first STA and one or more second channels allocated to the second STA; and
   transmit the signal to the first STA and the second STA based on the determined FDMA frame structure, and
   wherein, based on determination that a transmission Fast Fourier Transform (FFT) size of the AP is different from a reception FFT size of the first STA and the second STA, the FDMA frame structure is determined to include (i) one or more first direct current (DC) tones located at a center of a first frequency band including the one or more first channels, (ii) one or more second DC tones located at a center of a second frequency band including the one or more second channels, and (iii) one or more guard tones located between the one or more first channels and the one or more second channels, and
   wherein, based on determination that (i) the transmission FFT size of the AP is same as the reception FFT size of the first STA and the second STA and (ii) the one or more first channels and the one or more second channels are contiguous, the FDMA frame structure is determined to include one or more third DC tones located at a center of a third frequency band including both the one or more first channels and the one or more second channels.

6. The AP device of claim 5, wherein a number of the first DC tones is the same as a number of the second DC tones.

7. The AP device of claim 5, wherein a number of the first DC tones is different from a number of the second DC tones.

8. The AP device of claim 5, wherein, based on determination that (i) a number of the first channels are plural and (ii) the transmission FFT size of the AP is different from the reception FFT size of the first STA and the second STA, the FDMA frame structure is determined to include additional DC tones located at a center of each of the first channels.

* * * * *